Patented July 5, 1932

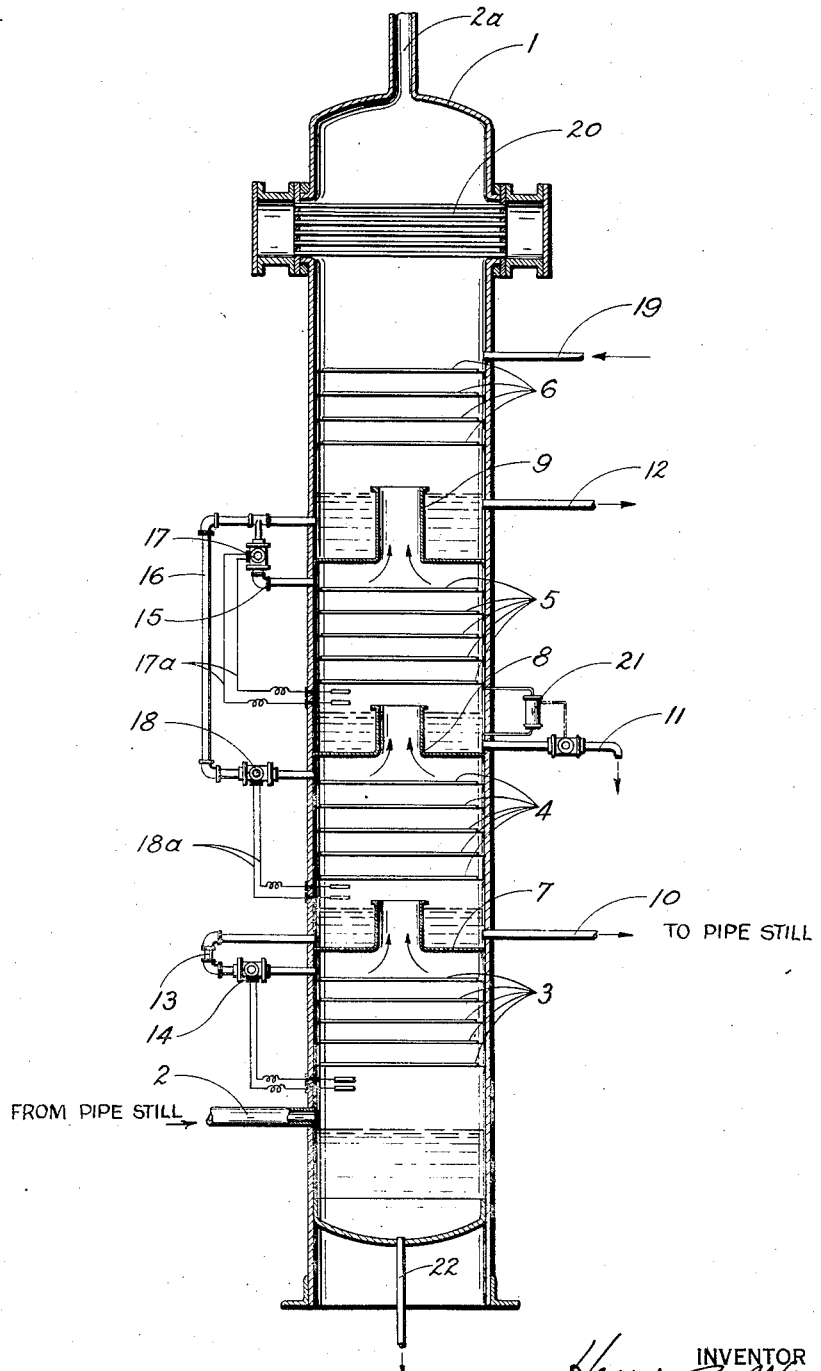

1,865,494

UNITED STATES PATENT OFFICE

HENRY E. WIDDELL, OF CLEVELAND, OHIO

METHOD FOR REFINING CRUDE OIL

Application filed December 22, 1927. Serial No. 241,748.

This invention relates to the art of refining oil and is more particularly concerned with a method of refining and fractionating crude oil by which substantially all the pressable petroleum wax in the wax carrying oil fractions is separated from the nonpressable wax and collected in one fraction in one continuous operation.

Heretofore crude oil has been refined by first distilling the oil and separating the wax bearing fractions; and then again distilling certain of the wax bearing fractions in a manner to separate the fractions containing pressable wax from those containing nonpressable wax. This redistillation has often been practiced in what is commonly known as a "wax cracking still". The second distillation has been necessary because after the first distillation the waxes are mixed and not in a form suitable for separation from the oil by filter pressing, part of the wax being in micro crystalline form, that is much like petrolatum, and capable of clogging the filter press screens. This second distillation requires extra equipment and is expensive in time, labor and fuel, and has been avoided by my invention.

There are three general types of wax known to the oil refiner, namely paraffin, slop and petrolatum. The paraffin wax is characterized by solidifying in fairly large crystals which can be separated from the oil in a filter press without clogging the screens. It is therefore often called pressable or crystalline wax. The slop wax crystallizes in much smaller crystals and clogs the filter press screens so that it is often called micro crystalline or nonpressable wax. The petrolatum wax is noncrystalline or amorphous, is nonpressable, and in general is readily separated by fractionation from the paraffin and slop waxes since it has a higher vaporization point and is condensable while the other waxes are still in a vapor or gaseous state. This invention therefore has little to do with the petrolatum wax but is directed to separation of the paraffin and slop waxes in a continuous process with resultant higher yield of paraffin or pressable wax than has heretofore been possible.

The figure accompanying and forming a part of this specification shows somewhat diagrammatically one form of apparatus with which my invention may be practiced.

The device shown in the drawing is an oil fractionating tower consisting of a casing 1 having an inlet line 2 near the bottom and outlet line 2a near the top; a plurality of ordinary bubble trays arranged in groups 3, 4, 5 and 6 within casing 1; collecting pans 7, 8 and 9 which have openings for gas or vapor to pass therethrough and which pans are disposed between the groups of bubble trays 3 and 4, 4 and 5, 5 and 6 respectively; lines 10, 11 and 12 through which oil from pans 7, 8 and 9 respectively may be drawn; line 13 an automatic temperature control valve 14 for refluxing oil from pan 7 to trays 3; lines 15 and 16 with automatic temperature control valves 17 and 18 respectively for refluxing oil from pan 9 to trays 5 and 4 respectively; an inlet line 19 for delivering oil onto trays 6 and a reflux condenser 20. Line 11 may have a float valve 21 to control the flow of oil therethrough if desired. Line 22 at the bottom of casing 1 serves as a means of withdrawing oil from the bottom of the tower.

My method may be better understood by the following description of one specific application of it, as follows:

A paraffin or semi-paraffin base oil, or a similar crude oil, from which the light constituents such as gasoline and kerosene have been previously distilled off, is heated to the desired temperature, for instance 700° F., in some suitable apparatus, for example a pipe still (not shown) and while so heated is led into a fractionating tower, such as that indicated in the figure, through line 2. The unvaporized portions will fall to the bottom of the tower above line 22. The vapors containing the pressable and slop waxes and vaporized petrolatum wax passes up through bubble trays 3 and the oil therein where the petrolatum wax is condensed. This condensed wax is carried down to the bottom of tower 1 with the oil which overflows from one tray 3 to the next lower one.

The vaporized portions of the oil containing paraffin and slop wax passes from the top tray 3 through pan 7 and then up through trays 4 and the oil therein where substantially all the slop wax is condensed at an average temperature of say 675° F. This slop wax carries some paraffin wax with it when it condenses. The condensed slop wax and any such paraffin wax is then carried with the oil overflowing from one tray 4 to the next lower one and eventually is collected in pan 7. Part of this oil in pan 7 may be led through line 13 to the top tray of group 3 where the heat of the ascending vapors will tend to vaporize the slop and paraffin waxes and carry them upwardly through pan 7 while not vaporizing any petrolatum wax which was associated with such oil from pan 7. Another and preferably the major part of the oil in pan 7 is withdrawn preferably continuously but periodically if desired through line 10, is returned to the heating still and after being vaporized is led through line 2 into the tower with other vapors which are entering the tower for the first time. The preceding operations are then repeated with the result that the paraffin wax which was originally condensed with the slop wax is largely liberated from the latter and passes together with the paraffin wax of the fresh vapor portions up through pan 8 and into the trays of group 5 and the oil therein where this paraffin wax is condensed and collected in pan 8 due to the overflow of oil from one pan 5 to the next lower and finally into pan 8 as above described for trays 3 and 4.

The wax condensed in trays 5 and collected in pan 8 is paraffin wax substantially free from slop wax and can be readily separated from the oil carrying it by filter pressing at a suitable temperature. For such pressing the oil and wax is withdrawn from the tower through line 11, the flow being controlled by any suitable means, for example float valve 21.

The vapors which rise above the trays of group 5 and pass through pan 9 are substantially free from all paraffin and slop waxes. These vapors pass through trays 6 and oil therein where wax free oils are condensed, the vapors which rise above trays 6 carrying oil which is condensed by contact with condenser 20 and falls onto trays 6 while uncondensed vapors escape from the tower through line 2a.

The oil on trays 6 is replenished by condensate from condenser 20 or by oil from line 19, or both.

The oil from pan 9 may be withdrawn in part through line 12 for other treatments, and in part through line 15 to replenish the oil in trays 5 and through line 16 to replenish the oil in trays 4.

It will be understood that the liquid wax free reflux oil from pan 9 which is led into trays 5 will have a sufficiently low temperature to temper the oil in trays 5 so as to condense any paraffin wax which comes into it in vapor form and that as a result the vapors of paraffin wax will substantially all be condensed below pan 9. Similarly the liquid wax free reflux oil led from pan 9 to trays 4 will serve to temper the oil in trays 4 to a temperature at which the slop wax will condense, but the paraffin wax will not condense. The flow of oil from pan 9 through lines 15 and 16 is controllably regulated so that the proper amount of such oil may be delivered to these respective groups of trays. This is preferably accomplished by thermostatic controls 17a and 18a which actuate the respective valves 17 and 18 in accordance with the temperatures in the trays.

I have discovered that liquid wax free reflux oil has properties which make possible the separation of slop wax from paraffin wax and believe that this property is traceable to an affinity of such oil for paraffin, wax, or the property of stripping the slop wax from the paraffin wax on revaporization in the presence of larger amounts of paraffin wax. Apparently, when the reflux carrying slop wax and some paraffin wax is revaporized it acts as an absorbing medium for crystalline wax but not for the slop wax and thereby carries the paraffin wax content above the bubble pans of group 4 in which the slop wax condenses and finally gives up its paraffin wax content in the bubble trays of group 5. The refluxed gas oil from line 15 extracts heat from the vapors ascending therethrough thereby cooling the same. Since gas oil in vapor form does not have as great capacity for carrying paraffin wax at lower temperatures as at high temperatures substantially all the paraffin wax in the vapors passing through pan 8 is collected in trays 5 and pan 8. Similarly, the carrying power of reflux oil for slop wax is lower at lower temperatures and as a result the oil led into trays of group 4 cools the slop wax carried in vapor form in vapors passing through trays 4 and condenses the slop wax.

In this manner an increased amount of high quality paraffin wax is obtained in a pressable condition in the condensate in pan 8 and as a result of a continuous process which does not require additional wax cracking equipment.

I have described my invention in some detail so that others skilled in the art may be enabled to practice the invention and not as a definition of the extent of my invention. The extent or scope of my invention is defined in what is claimed.

I claim:

1. The method of treating a paraffin or semi-paraffin base oil from which the lighter constituents such as gasoline and kerosene have been previously distilled off, which consists in heating the oil to the point of vaporization, conducting the vapor to a fractionator and subjecting the rising vapors to successively lower temperatures to condense the vapor into fractions containing pressable wax and pressable and non-pressable waxes, revaporizing the fraction containing pressable and non-pressable waxes and recondensing it into separate fractions, and collecting the pressable wax-containing fraction as it is condensed in the first said fraction containing pressable wax.

2. The method of treating a paraffin or semi-paraffin base oil from which the lighter constituents such as gasoline and kerosene have been previously distilled, which consists in heating the oil to the point of vaporization, conducting the vapor to a fractionator and subjecting the rising vapors to successively lower temperature to condense the vapor into fractions containing pressable wax and pressable and non-pressable waxes, revaporizing the fraction containing mixed waxes and adding the resulting vapors to the vapors of a succeeding portion of oil, and condensing the combined vapors into fractions.

3. The method of treating a paraffin or semi-paraffin base oil from which the lighter constituents such as gasoline and kerosene have been previously distilled, which consists in vaporizing the oil, conducting the vapor to a fractionator and subjecting the rising vapors to successively lower temperatures to condense the vapors into fractions containing pressable wax and pressable and non-pressable waxes, continuously adding oil from the mixed fraction to succeeding portions of oil and vaporizing the thus combined oils, and condensing the combined oils into fractions.

4. The method of treating a paraffin or semi-paraffin base oil from which the lighter constituents such as gasoline and kerosene have been previously distilled, which consists in vaporizing the oil, conducting the vapor to a fractionator and subjecting the rising vapors to successively lower temperatures to condense the vapors into fractions containing pressable wax, pressable and non-pressable waxes and a fraction substantially free from wax, continuously revaporizing the mixed fraction and mixing such vapors with fresh incoming vapors and condensing the mixed vapors and employing oil from the wax-free fraction in condensing said mixed vapors to separate the latter into fractions.

In testimony whereof I hereunto affix my signature this 17th day of December, 1927.

HENRY E. WIDDELL.